United States Patent [19]

Chou

[11] Patent Number: 5,368,122
[45] Date of Patent: Nov. 29, 1994

[54] ELECTRICAL BICYCLE

[76] Inventor: Wen-Cheng Chou, No. 1-2, Lane 975, Chun-Jih Road, Tao-Yuan City, Taiwan, Prov. of China

[21] Appl. No.: 170,832
[22] Filed: Dec. 21, 1993
[51] Int. Cl.$^5$ .................. B62K 11/10; B60K 1/04
[52] U.S. Cl. .................. 180/220; 180/205; 180/65.2; 180/65.6; 280/214
[58] Field of Search .............. 180/220, 230, 231, 205, 180/65.2, 65.6; 280/212, 214, 215

[56] References Cited

U.S. PATENT DOCUMENTS

| | | | |
|---|---|---|---|
| 1,297,218 | 3/1919 | Merkel | 180/205 X |
| 2,586,702 | 2/1952 | Obram | 180/230 |
| 4,671,524 | 6/1987 | Hanbenwallner | 280/212 |

FOREIGN PATENT DOCUMENTS

| | | | |
|---|---|---|---|
| 3623800 | 4/1987 | Germany | 180/220 |
| 3200498 | 9/1991 | Japan | 180/220 |
| 4038289 | 2/1992 | Japan | 180/220 |

OTHER PUBLICATIONS

Department of Engineering and Downing College, University of Cambridge U.K., P. Campbell, An Electric Wheel Motor Unit Applied to Two Wheeled Vehicles, all pages.

*Primary Examiner*—Karin L. Tyson
*Assistant Examiner*—F. Zeender
*Attorney, Agent, or Firm*—Morton J. Rosenberg; David I. Klein

[57] ABSTRACT

An electrical bicycle comprises a frame body, a battery and a rotation controller. Characterized in that a driving mechanism is disposed at the rear triangle supporter and one side of the spindle. The transmission collar and fly-wheel are disposed at both ends of the spindle respectively. The transmission collar is rotated by means of the DC motor, the first and second bevel pinions. The output of the DC motor is reduced by the combination of the first and second bevel pinions. No chain is needed, consequently the defects inherited thereof are omitted. This electrical bicycle is free from noise and pollutant emissions. The driving mechanism can be switched on easily as necessary.

1 Claim, 5 Drawing Sheets

ELECTRICAL BICYCLE

BACKGROUND OF THE INVENTION

This invention relates to bicycles and, more particularly an electrically powered bicycle which has the benefit of low noise output, no pollutant emission and convenience of use. Additionally, this electrical bicycle may be used as a manually operated conventional bicycle.

The subject electrical bicycle has many advantages, when used as a sporting vehicle. Motorcycles may be replaced with the electrical bicycle since it has no pollutant emission and low noise output. Modern technology has made progress in development of batteries and a durable battery can be manufactured without difficulty. In light of this, the electrical bicycle has become commercially more important since it has a very low pollution.

In some prior art electrical bicycles, a driving mechanism is disposed at the suitable position on the frame. This driving mechanism is linked to a fly-wheel by a chain. A driving force is transferred to the fly-wheel and the bicycle is able to be driven. Such prior art driving mechanisms are similar to motorcycles. The only difference between the two is the engine of the motorcycle which is replaced with a driving mechanism powered by a battery. Such prior art electrical bicycles have the following disadvantages:

1. Since a chain is used to transfer the driving force from the driving mechanism to the fly-wheel of the bicycle, the mechanical performance is low and the wear is high. Additionally, the chain must be lubricated often in order to decrease friction. Consequently, dirt may accumulate on the chain and the users pants may be stained by the lubricant.
2. When the electrical bicycle rides at a high speed, on a straight road or an off-road, the chain may vibrate violently. In some cases, the chain may be out-of-position. The recovery of the chain takes time and stains the users hands.

SUMMARY OF THE INVENTION

It is the object of this invention to provide an electrical bicycle which has a highly efficient driving mechanism to provide an easy ride and a trouble free trip for the user.

It is still another object of this invention to provide an electrical bicycle which has no pollutant emission and low noise output, and may be ridden by manual operation.

DETAILED DESCRIPTION OF THE PREFERRED EMBODIMENT

Figure 1:
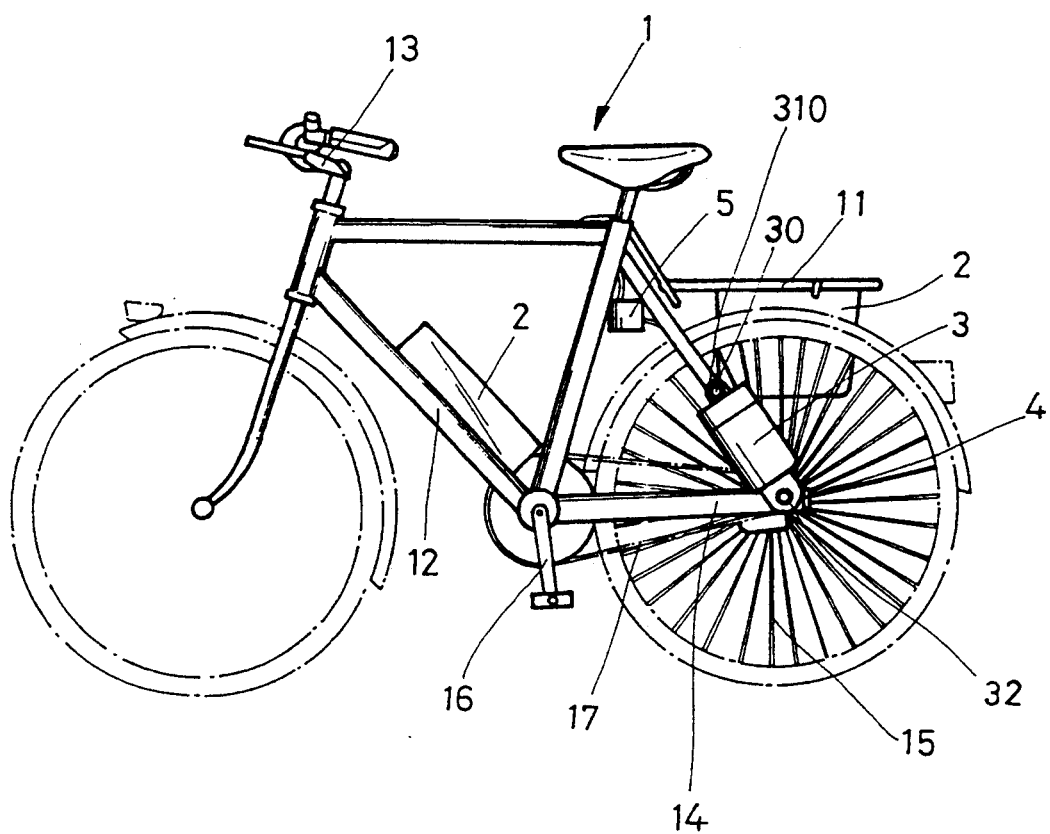
FIG. 1 is an elevational view of an electrical bicycle made according to this invention.
Figure 2:
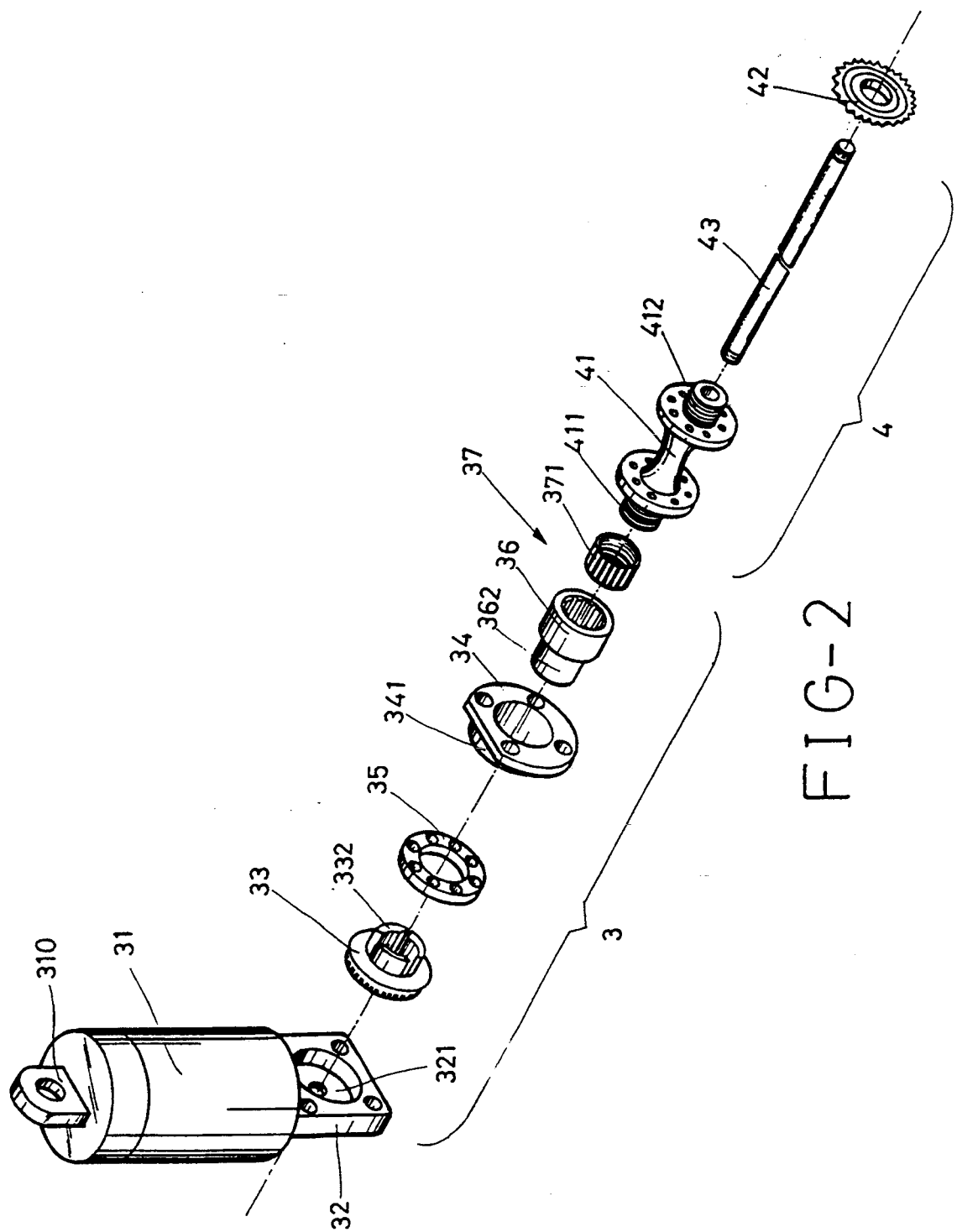
FIG. 2 is an exploded perspective view of the driving mechanism of the electrical bicycle made according to this invention.
Figure 3:
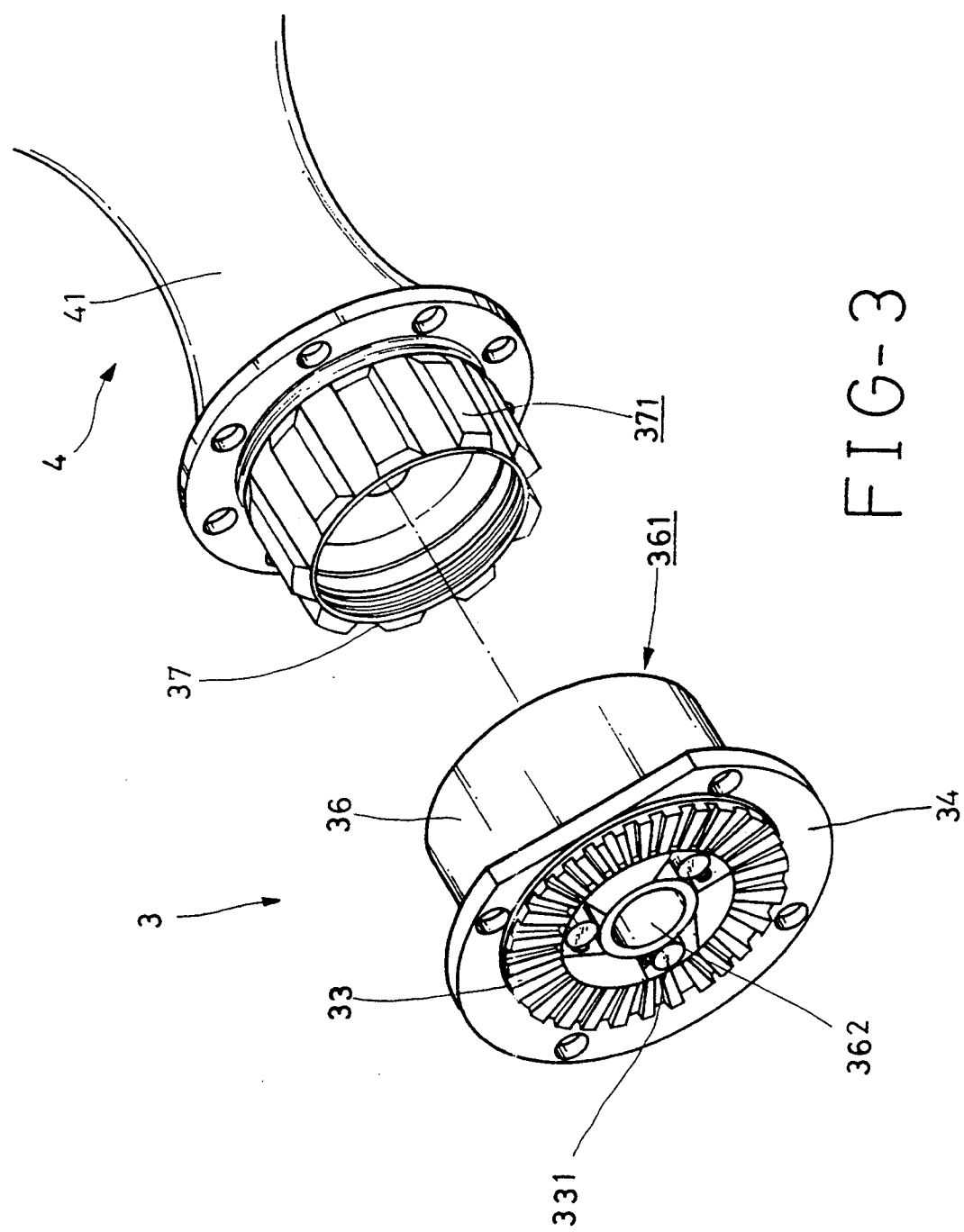
FIG. 3 is a perspective view showing the driving wheel and the spindle.
Figure 4:
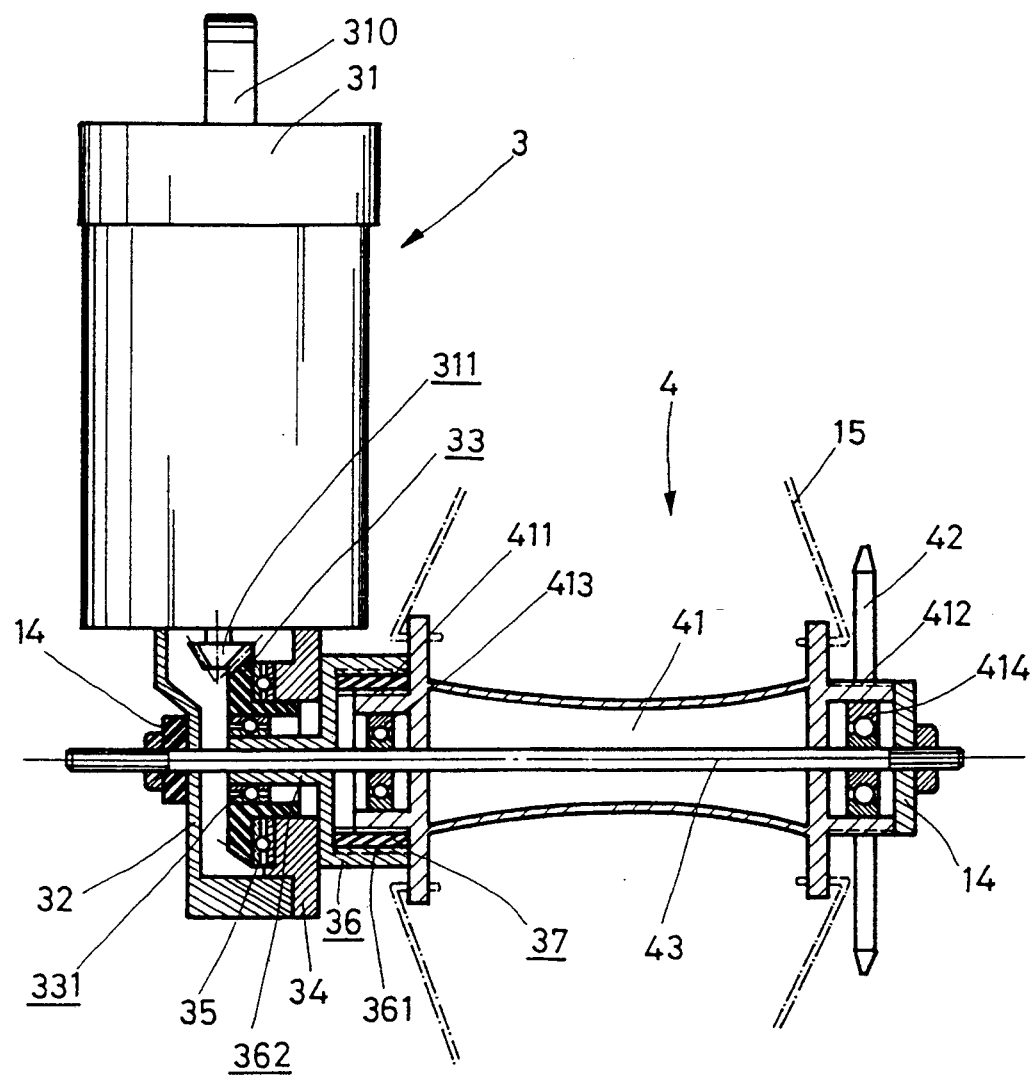
FIG. 4 is a cross-sectional view of the driving mechanism of the electrical bicycle made according to this invention; and, FIG. 5 is a flow chart of the rotation controller of the electrical bicycle.

Referring to FIGS. 1, 2 and 3, the electrical bicycle of this invention comprises a frame body 1, a battery 2 located on one side of the rear seat 11 and the front triangle supporter 12. A rotation controller 5 is disposed near the front triangle supporter 12 on frame body 1. Rotation controller 5 is connected to and controlled by a handle 13. A driving mechanism 3 is disposed at the side of the rear seat 11 and fixed to the rear triangle supporter 14. Driving mechanism 3 includes a DC motor 31 with a lug 310 located at an upper position. The DC motor 31 is attached to the rear triangle supporter 14 by means of a fastener 30. A first bevel pinion 311, as shown in FIG. 4, is attached to the output shaft of the motor 31. The bevel pinion 311 is mounted within the connecting housing 32. A ring slot 321 is formed in connecting housing 32 as shown in FIG. 2. A second bevel Dinion 33 with a rotation limiting device 331 engages pinion gear 311. Second bevel pinion 33 is mounted in ring slot 321 and meshes with said first bevel pinion 311. A positioning housing 34 with flange 341 is attached to the connecting housing 32. A bearing 35 is located between the flange 341 and the second bevel pinion 33. A transmission collar 36 is provided having a gear slot 361 internal thereto. A sleeve 362 is disposed at the front position of the transmission collar 36 having a smaller diameter than a rear portion thereof. A gear sleeve 37 is attached to one side of the spindle 41 and has a gear slot 371 which meshes with the transmission collar 36. A thread portion 372 is provided internal to gear sleeve 37.

A transmission mechanism 4 for the rear wheel 15 is disposed at the rear triangle support 14. The transmission mechanism 4 includes a spindle 41 having threaded sleeves 411, 412 formed at opposing ends. The left threaded sleeve 411 is received within gear sleeve 37 and the right sleeve 412 is received within fly-wheel 42. A shaft member 43 is passed through the spindle 41, the transmission collar 36, the second bevel pinion 33 and connecting housing 32 with shaft member 43 being fixed to the rear triangle supporter 14.

By the combination of these above described elements the spindle 41 may be rotationally displaced by DC motor 31 or by displacement of the bicycle pedal 16. Thus, the electrical bicycle may be operated as a conventional bicycle as well as an electrical bicycle if necessary.

The operation of the electrical bicycle may be seen in reference to FIG. 4. When the electrical bicycle is ridden as a conventional manually operated bicycle, the chain 17 which connects the pedal 16 and fly-wheel 42 can be actuated by the pedal 16. As shown in FIG. 4, the fly-wheel 42 is attached to the riqht threaded sleeve 412. The spindle 41 rotates freely thereof via the bearings 413, 414 disposed inside the threaded sleeve 411, 412. By this arrangement, the spindle 41 rotates freely on the shaft member 43. When the fly-wheel 42 rotates clockwise, the spindle 41 is displaced to similarly rotate clockwise. This rotationally drives the rear wheel 15 and the bicycle moves accordingly.

If the rider hopes to taker a rest and wants to move the bicycle with battery operation, the rider then may input a signal to the rotation controller 5 through handle 13. As a result, power from the battery 2 is supplied to the DC motor 31 and drives the first bevel pinion 311 and the second bevel pinion 33. This results in a speed decrease and a torque increase. When the second bevel pinion 33 rotates, the rotation limiting device 331 and the sleeve 362 of the transmission collar 36 couple together as shown in FIG. 3. The transmission collar 36 rotates clockwise and attached to the gear sleeve 37 at the right position of the spindle 41 via the coupler of gear slots 361, 371 for rotation of the spindle 41.

Figure 5:
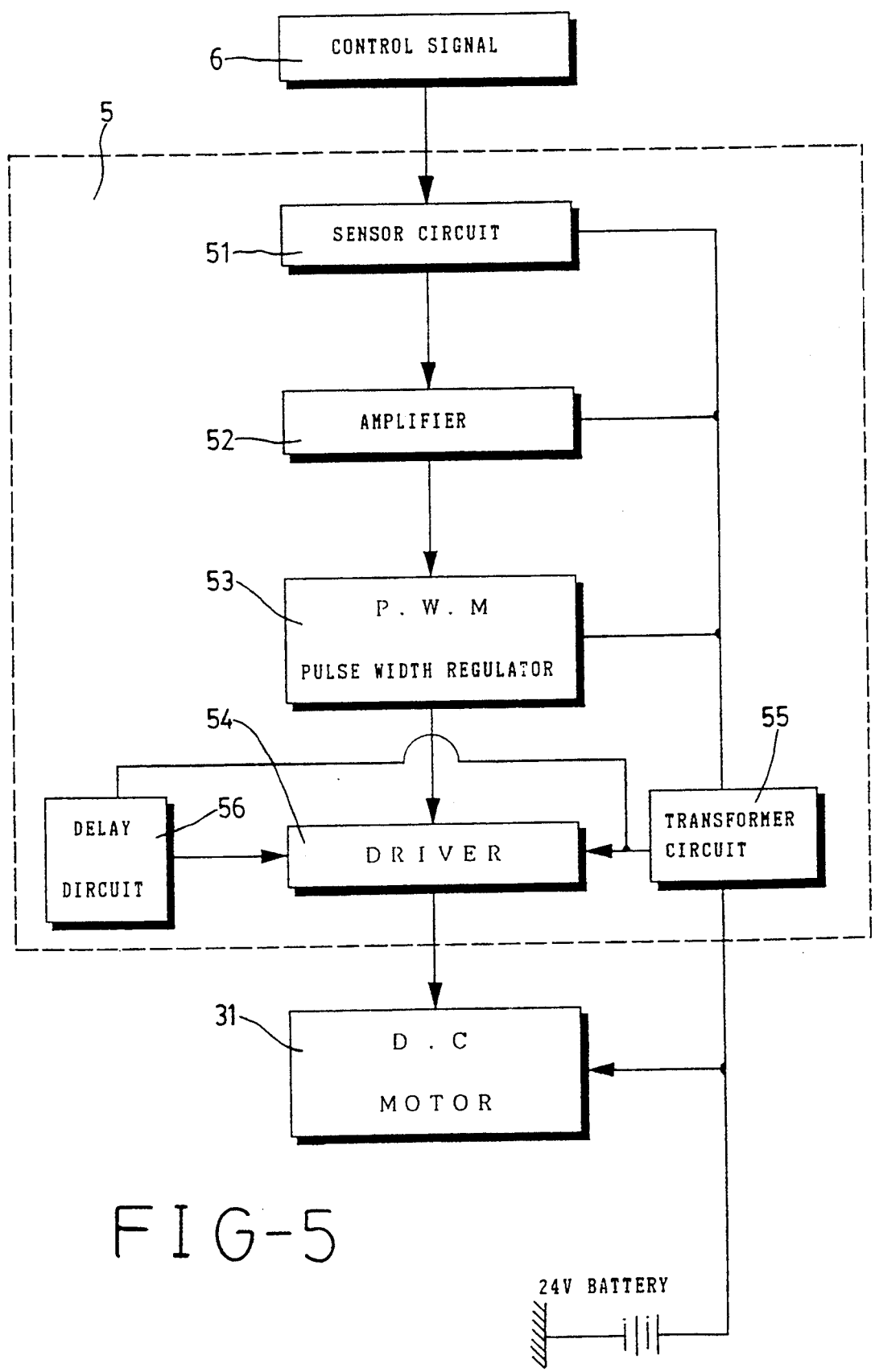

As shown in FIG. 5, the rotation controller 5 used to control the rotation speed of the DC motor 31 includes a sensor circuit 51, amplifier 52, P.W.M. pulse width regulator 53, driver 54, transformer circuit 55 and delay circuit 56. Rotation controller 5 is known to those skilled in the art and is not within the scope of this invention, thus no detailed description is provided. The control signal 6 is disposed at the handle 13 of the frame body 1 and the P.W.M. pulse width regulator 53 is input to change the rotation speed of the DC motor 31.

This invention has the following advantages:

1. The driving mechanism 3 is disposed at one side of the spindle 41 and when the DC motor 31 rotates, the first and second bevel pinions 311, 33 rotate accordingly. The transmission collar 36 and the spindle 41 rotate clockwise. The output of the DC motor 31 is reduced by the application of the first and second bevel pinions 311, 33. On the other hand, the first and second bevel pinions 311, 33 may be replaced with a worm gear assembly to reduce the output of the DC motor, since the spindle is directly driven by the transmission collar without the use of a chain. This direct transmission is free from pollution and noise and diminishes the problem of an out-of-position chain.

2. The transmission collar 36 and the fly-wheel 41 are disposed at both sides of the spindle 41, which by this arrangement, the bicycle can be driven by the driving mechanism and the pedal respectively. The sleeve 362 of the transmission collar 36 is installed within the direction limited device 331 of the second bevel pinion 36. When the spindle 41 is moved by the chain 17, the transmission collar 36 with the spindle 41 are idle on the shaft member 43. The rotation will not be transferred to the first and second bevel pinions 311, 33 and the DC motor 31 and then decrease the load of the pedal. Thus, when the driving mechanism is not applied, the operation of the electrical bicycle is the sane as a conventional bicycle, and the driving mechanism may be switched on easily as necessary.

3. The driving mechanism 3 and the battery 2 are balanced with each other without any negative impact to the bicycle..

Although the present invention has been described in connection with preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. An electrical bicycle comprising:
   a frame body having a front triangle supporter, a rear triangle supporter and a rear seal;
   a battery mounted to said frame body on one side of the front triangle supporter;
   a rotation controller mounted to the frame body;
   a driving mechanism located on one side of the rear seat and fixed to the rear triangle supporter, said driving mechanism including,
      a DC motor having a lug extending from an upper section thereof, said DC motor being fastened to the rear triangle supporter, a first bevel pinion gear being attached to an output shaft of the DC motor;
      a connecting housing mounted to a lower section of said driving mechanism having said first bevel pinion gear therein, said connecting housing having a ring slot formed therein;
      a second bevel pinion gear having a rotation limiting device engageable with said second bevel pinion gear being mounted in said ring slot and meshed to said first bevel pinion gear;
      a positioning housing having a flange member attached to the connecting housing and a bearing located between the flange member and the second bevel pinion gear;
      a transmission collar having an inner gear slot and a sleeve disposed at a front section of the transmission collar;
      a gear sleeve secured to one side of a spindle, said gear sleeve having a gear sleeve slot which is in meshed engagement with the transmission collar having an internal thread portion;
   a transmission mechanism for a rear wheel of said electrical bicycle disposed adjacent the rear triangle supporter, said spindle having threaded sleeves at opposing ends thereof, one of said threaded sleeves being received in said gear sleeve and the other of said threaded sleeves being received within a fly-wheel; and,
   a shaft member extending through the spindle, the transmission collar, the second bevel pinion gear, and the connecting housing, said shaft member being fixedly located to the rear triangle supporter.

* * * * *